US012355956B2

(12) United States Patent
Hong et al.

(10) Patent No.: US 12,355,956 B2
(45) Date of Patent: Jul. 8, 2025

(54) MULTI-CHANNEL VIDEO RATE CONTROL FOR EXTENDED REALITY STREAMING

(71) Applicant: GOOGLE LLC, Mountain View, CA (US)

(72) Inventors: Danny Hong, New York, NY (US); Zhuo Chen, Menlo Park, CA (US)

(73) Assignee: GOOGLE LLC, Mountain View, CA (US)

( * ) Notice: Subject to any disclaimer, the term of this patent is extended or adjusted under 35 U.S.C. 154(b) by 62 days.

(21) Appl. No.: 18/241,496

(22) Filed: Sep. 1, 2023

(65) Prior Publication Data

US 2025/0080728 A1  Mar. 6, 2025

(51) Int. Cl.
| | | |
|---|---|---|
| *H04N 7/12* | (2006.01) | |
| *G06T 7/50* | (2017.01) | |
| *H04N 19/115* | (2014.01) | |
| *H04N 19/124* | (2014.01) | |

(52) U.S. Cl.
CPC .............. *H04N 19/115* (2014.11); *G06T 7/50* (2017.01); *H04N 19/124* (2014.11); *G06T 2207/10028* (2013.01)

(58) Field of Classification Search
CPC ...... H04N 19/115; H04N 19/124; G06T 7/50; G06T 2207/10028
See application file for complete search history.

(56) References Cited

U.S. PATENT DOCUMENTS

| | | | |
|---|---|---|---|
| 2020/0128242 A1 | 4/2020 | Aristarkhov et al. | |
| 2021/0209806 A1* | 7/2021 | Oh | H04N 21/236 |
| 2021/0409767 A1* | 12/2021 | Oh | H04N 21/85406 |
| 2022/0173979 A1* | 6/2022 | Wickes | H04L 41/147 |
| 2023/0067584 A1* | 3/2023 | Zhou | H04N 19/167 |
| 2023/0316674 A1* | 10/2023 | Boesel | H04N 7/157 |
| | | | 345/633 |
| 2024/0378820 A1* | 11/2024 | Xiong | H04N 13/128 |

OTHER PUBLICATIONS

Childers, Reese Eric, "A Study of Rate Control for H.265/HEVC Video Compression," Aug. 2020, University of Central Arkansas, <<https://uca.edu/cse/files/2020/07/A_Study_of_Rate_Control_for_H.265_HEVC_Video_Compression.pdf>>; 84 pages.
Pixeltools, "Rate Control and H.264," Theoretical Discussion on Achieving Rate Control During Encoding; downloaded on Sep. 1, 2023 from <<https://www.pixeltools.com/rate_control_paper.html>>, 9 pages.
Wu, Zongze et al., "Rate Control in Video Coding", Recent Advances on Video Coding; J. Del Ser Lorente, Ed. InTech; Jul. 5, 2011; doi:10.5772/14585; pp. 79-117.

* cited by examiner

*Primary Examiner* — Gims S Philippe

(57) ABSTRACT

A cloud-based extended reality (XR) system includes a server configured to encode a set of frames each associated with an XR scene to be displayed. To encode the set of frames, the server estimates a total number of encoded output bits for the set of frames based on a set of quantization parameters (QPs). The set of QPs includes a corresponding QP for each frame of the set of frames and one or more predetermined relationships between the corresponding QPs. The server then compares the estimated total number of encoded output bits to a target frame size threshold. Based on the estimated total number of encoded bits being outside the target frame size threshold, the server updates the set of QPs so as to maintain the predetermined relationships between the QPs.

20 Claims, 3 Drawing Sheets

MULTI-CHANNEL VIDEO RATE CONTROL FOR EXTENDED REALITY STREAMING

BACKGROUND

Cloud-based extended reality (XR) systems include servers configured to provide an encoded XR stream to a head-worn display (HWD). To this end, these servers execute XR applications that generate a multi-channel video stream including sets of frames that each represent a respective view of an XR scene. The servers then encode these sets of frames and provide, over a network, the encoded frames to the HWD as part of an encoded XR stream. The HWD decodes the encoded XR stream and then displays sets of decoded frames each representing respective views of the XR scene to a user. To help improve user experience, some servers are configured to generate additional sets of encoded frames for an XR stream that include data, such as depth data, used in producing the final displayed views for the HWD. However, these additional encoded frames must be produced in a way that matches the available capacity of the network used to transmit them. Underutilization of the available capacity increases the likelihood that the frames presented to a user have a lower quality than the network can support, negatively impacting user experience. Further, overutilization of the available capacity increases the likelihood of increased latency and packet loss for an XR stream, which also negatively impacts user experience.

BRIEF DESCRIPTION OF THE DRAWINGS

The present disclosure may be better understood, and its numerous features and advantages are made apparent to those skilled in the art by referencing the accompanying drawings. The use of the same reference symbols in different drawings indicates similar or identical items.

DETAILED DESCRIPTION

Figure 1:
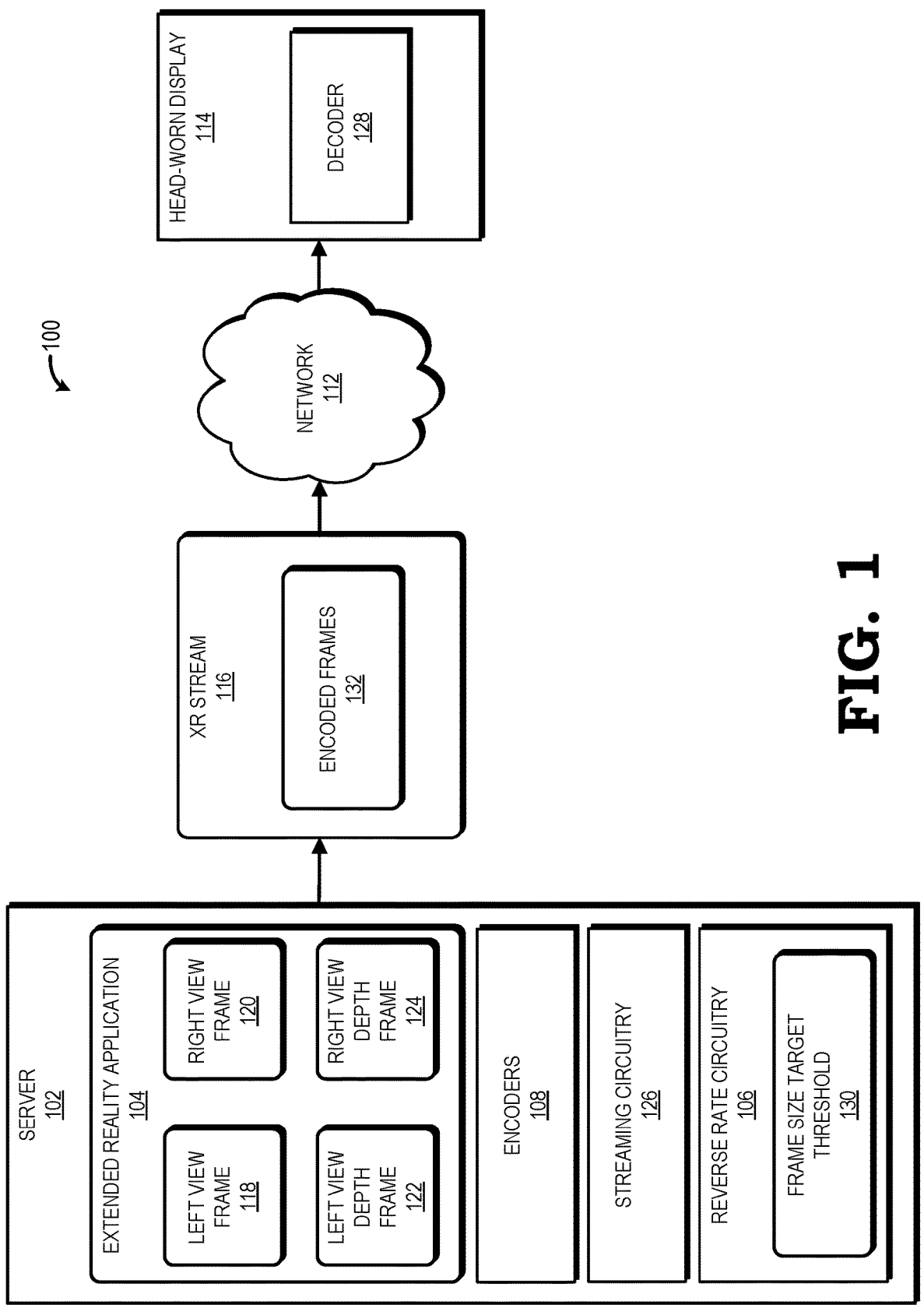
FIG. 1 is a block diagram of a cloud-based extended reality (XR) system employing multi-channel video rate control, in accordance with some embodiments.

Within some cloud-based extended reality (XR) systems, a head-worn display (HWD) is configured to display an XR scene, such as a virtual reality (VR), augmented reality (AR), or mixed reality (MR) scene, to a user. To this end, the HWD is configured to present a multi-channel video that includes a first set of frames to display to the left eye of the user and a second set of frames to display to the right eye of the user. To help support the HWD in presenting the multi-channel video, a cloud-based XR system includes one or more servers configured to execute an XR application. While executing the XR application, a server is configured to generate a first frame presenting a first view (e.g., left view) of an XR scene and a second frame presenting a second view (e.g., right view) of the XR scene. Further, the server is configured to generate additional frames representing further data of the XR scene. For example, the server generates a third frame representing the depth values of the first view of the XR scene and a fourth frame representing the depth values of the second view of the XR scene. After generating the first, second, third, and fourth frames, the encoders of the server encode each channel (e.g., frame) representing the XR scene and provide the encoded frames to the HWD as part of a multi-channel video stream, also referred to herein as an "XR stream".

However, providing such an XR stream that includes multiple sets of encoded frames representing multiple views of an XR scene as well as other data associated with these views increases the bandwidth needed to transmit the XR stream over the network, increasing the likelihood that packets of the XR stream are lost or delayed and negatively impacting user experience. As such, systems and techniques disclosed herein include a server configured to control the rate at which frames are encoded based on the available bandwidth of the network. For example, the server adjusts the quantization parameter (QP) used to encode a frame based on the available bandwidth of the network so as to decrease the likelihood that a resulting video stream underutilizes or overutilizes the available bandwidth of the network.

To help decrease the likelihood that a multi-channel video stream (e.g., XR stream) underutilizes or overutilizes the available bandwidth of a network, systems and techniques described herein are directed to multi-channel video rate control. To this end, the encoders of a server use a set of QPs that includes a corresponding QP for each frame (e.g., channel) of a set of frames representing an XR scene to be encoded. Additionally, two or more QPs in the set of QPs have a relationship defined by one or more predefined relationships. For example, the set of QPs includes one or more predetermined relationships between two or more QPs that represent an optimized relationship between the QPs. To encode the set of frames using the set of QPs, the server first determines a respective complexity for each frame to be encoded. The server then estimates a respective encoded output bit calculation for each frame of the set of frames to be encoded based on the complexity associated with the frame and the QP of the set of QPs associated with the frame. Such an encoded output bit calculation, for example, represents the number of bits of an encoded frame produced from encoding a frame based on a respective complexity and respective QP of the set of QPs. After estimating an encoded output bit calculation for each frame of the set of frames to be encoded, the server combines the encoded output bit calculations for each frame to produce a total encoded bit calculation and compares the total encoded bit calculation to a target frame size threshold. The target frame size threshold, for example, is based on the amount of available bandwidth on a network. Based on the total encoded bit calculation being greater than or less than the target frame size threshold, the server updates the set of QPs. For example, the server updates one or more QPs of the set of QPs while maintaining one or more predetermined relationships between the QPs of the set of QPs. After updating the set of QPs, the server again estimates the encoded bit calculations for each frame of the set of frames to be encoded. Based on the total encoded bit calculation being equal to the target frame size threshold, the encoders of the servers encode each frame of the set of frames to be encoded using a respective QP of the set of QPs. In this way, the server is configured to jointly update the QPs for each frame in an XR scene while maintaining the predetermined relationships between the QPs.

Referring now to FIG. 1, a cloud based XR system 100 employing multi-channel video rate control is presented, in accordance with some embodiments. Cloud-based XR system 100 includes one or more servers 102 communicatively coupled to an HWD 114 by at least one network 112. Network 112 is configured to allow for the transmission and reception of data between the servers 102 and HWD 114 and includes, for example, wired and wireless networks, such as Ethernet, the Internet, Wi-Fi, or any combination thereof. In embodiments, HWD 114 is configured to display an XR scene including one or more graphics objects to a user. To provide such an XR scene to a user, in some embodiments, HWD 114 is configured to display a multi-channel video that includes one or more frames that each include data (e.g., pixel values) representing a first view (e.g., left view) of the XR scene (e.g., left view frames) to a first (e.g., left) eye of the user and one or more frames including data representing a second (e.g., right) view of the XR scene (e.g., right view frames) to a second (e.g., right) eye of the user.

To support HWD 114 in displaying an XR scene, cloud-based XR system 100 includes one or more servers 102 configured to execute XR application 104. XR application 104, for example, includes a VR application, AR application, MR application, or any combination thereof configured to render one or more frames for a multi-channel video representing the XR scene. As an example, while executing XR application 104, a server 102 is configured to render a first frame (e.g., left view frame 118) including data (e.g., pixel values) representing a first view (e.g., left view) of an XR scene and a second frame (e.g., right view frame 120) including data (e.g., pixel values) representing a second view (e.g., right view) of the XR scene. In embodiments, XR application 104 is also configured to generate frames including data (e.g., a depth map) representing the depth values in two or more respective views of the XR scene. As an example, XR application 104 is configured to generate left view depth frame 122 representing the depth values in a first view (e.g., left view) of the XR scene and generate a right view depth frame 124 representing the depth values of a second view (e.g., right view) of the XR scene. Each frame representing depth values (e.g., left view depth frame 122, right view depth frame 124) includes, for example, data indicating one or more depth values (e.g., z-values) for each graphics object within the frame (e.g., the graphics objects within the XR scene included in the frame). After generating two or more frames including data representing respective views of the XR scene and two or more frames including data representing the depth values of corresponding views of the XR scene, the server 102 is configured to encode the generated frames (e.g., channels). To encode these frames, the server 102 includes one or more encoders 108 that include one or more hardware encoders, one or more software encoders, or both configured to encode each channel (e.g., frame) representing an XR scene through, for example, compression, reorganization, and manipulation based on one or more codecs implemented by encoder 108.

In embodiments, to encode the generated frames, the encoders 108 are configured to use a set of QPs. This set of QPs, for example, includes a respective QP for each frame (e.g., channel) to be encoded. According to embodiments, the set of QPs includes predetermined relationships between two or more QPs of the set of QPs. For example, the set of QPs includes optimized relationships to help ensure that a resulting XR stream does not overutilize or underutilize the available bandwidth of network 112. To encode a set of frames using the set of QPs, the server 102 includes a reverse rate circuitry 106 configured to estimate a number of encoded output bits for each frame (e.g., left view frame 118, right view frame 120, left view depth frame 122, right view depth frame 124) of the set of frames to be encoded based on the QP of the set of QPs associated with the frame. The number of encoded output bits for a frame, for example, represents the number of bits an encoded frame produced from encoding a frame using a respective QP. After estimating the number of encoded output bits for each frame of the set of frames to be encoded, the reverse rate circuitry 106 combines the number of encoded output bits for each frame to produce a number of total encoded output bits. The reverse rate circuitry 106 then compares the number of total encoded output bits to a frame size target threshold 130. The frame size target threshold 130, for example, includes a value or range of values representing a target size for the number of total encoded output bits.

According to embodiments, the server 102 is configured to determine the frame size target threshold 130 based on the amount of available bandwidth on network 112. Based on the number of total encoded output bits being outside (e.g., less than or greater than) the frame size target threshold 130, the reverse rate circuitry 106 updates one or more QPs of the set of QPs. For example, the reverse rate circuitry 106 updates one or more QPs of the set of QP so as to have the number of total encoded output bits approach the frame size target threshold 130. As another example, the reverse rate circuitry 106 updates one or more QPs of the set of QPs so as to maintain one or more predetermined relationships between two or more QPs of the set of QPs. In this way, the reverse rate circuitry 106 is configured to update the QPs of each frame in a joint manner based on the predetermined relationships (e.g., optimal relationships) between the QPs. By jointly updating the QPs of each frame based on the predetermined relationships, the reverse rate circuitry 106 helps reduce the likelihood that the resulting XR frame underutilizes or overutilizes the available bandwidth of network 112.

In embodiments, based on the number of total encoded output bits being within (e.g., equal to) the frame size target threshold 130, the encoders 108 encode the frames using the set of QPs. After encoding two or more frames including data representing respective views of the XR scene and two or more frames including data representing the depth values of corresponding views of the XR scene, encoder 108 provides these encoded frames 132 to streaming circuitry 126 included in the server 102. Streaming circuitry 126, for example, is configured to packetize the encoded frames 132 provided from encoder 108 to produce a set of encoded packets, also referred to herein as XR stream 116. Streaming circuitry 126 then transmits the set of encoded packets representing the encoded frames 132 over network 112 to HWD 114. In response to receiving one or more encoded packets, HWD 114 is configured to decode the encoded packets to produce one or more decoded frames (e.g., decoded left view frame 118, decoded right view frame 120, decoded left view depth frame 122, decoded right view depth frame 124). To this end, HWD 114 includes decoder 128 configured to decode one or more encoded packets based on one or more codecs (e.g., H.264, H.265, VP9, AV1). After decoding the encoded packets, HWD 114 then, for example, directs light representing a first frame (e.g., left view frame 118) to a first (e.g., left) eye of a user and light representing a second frame (e.g., right view frame 120) to a second (e.g., right) eye of the user. To help compensate for the movement of HWD 114, movement of a user, or both, HWD 114 is configured to perform one or more reprojection techniques to modify the frames displayed to the user based on one or more decoded frames (e.g., left view depth frame 122, right view depth frame 124) representing the depth values of the XR scene presented to the user. These reprojection techniques, for example, include the HWD modifying one or more frames indicated in a received XR stream so as to match a pose of the HWD of the user based on the movement of the HWD and the depth values indicated in one or more frames. In embodiments, reverse rate circuitry 106 using a set of QPs with one or more predetermined relationships (e.g., optimal relationships) to encode the XR stream helps ensure that the frames of the XR stream have a higher quality when reprojection is applied to the frame. That is to say, reverse rate circuitry 106 maintaining the predetermined relationships between QPs when encoding the XR streams helps ensure that the relationships (e.g., optimal relationships) represented by the QPs are preserved in the resulting encoded frames, helping to increase the quality of the final views presented to the eyes of the user.

Figure 2:
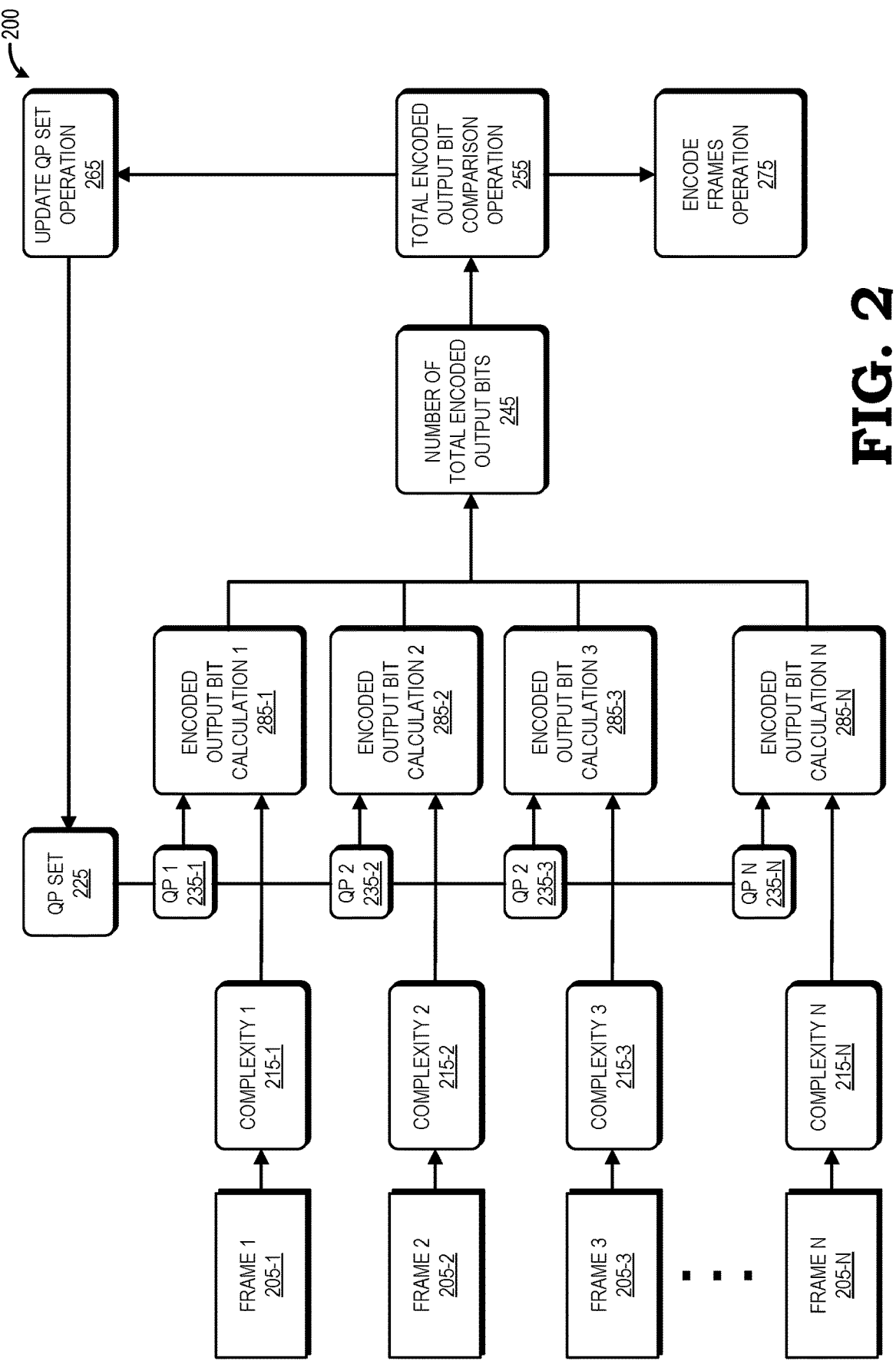
FIG. 2 is a flow diagram of an example operation for multi-channel video rate control, in accordance with some embodiments.

Referring now to FIG. 2, an example operation 200 for multi-channel video rate control is presented, in accordance with some embodiments. In embodiments, example operation 200 includes encoders 108 encoding a set of frames that includes two or more frames including data (e.g., pixel values) representing two or more views (e.g., left view, right view) of an XR scene and two or more frames including depth data (e.g., depth maps) representing two or more views (e.g., left view, right view) of the XR scene. Referring to the example embodiment of FIG. 2, a set of frames includes frame 1 205-1, frame 2 205-2, frame 3 205-3, and frame N 205-N representing an N number of frames. Though the example embodiment of FIG. 2 presents a set of frames as including four frames (205-1, 205-2, 205-3, 205-N) representing an N number of frames, in other embodiments, the set of frames can include any number of frames.

In embodiments, the encoders 108 encode the set of frames using QP set 225. QP set 225, for example, includes a respective QP 235 for each frame 205 (e.g., channel) of the set of frames to be encoded. As an example, QP set 225 includes a first QP 1 235-1 associated with frame 1 205-1, a second QP 2 235-2 associated with frame 2 205-2, a third QP 3 235-3 associated with frame 3 205-3, and a fourth QP N 235-N associated with frame N 205-N. According to embodiments, QP set 225 includes a predetermined relationship between two or more QPs 235. For example, QP set 225 includes a relationship where two or more QPs 235 are equal, a relationship where two or more QPs 235 differ by a first value (e.g., 1), a relationship where two or more QPs 235 differ by a second value (e.g., 2), or any combination thereof, to name a few. To encode the frames 205 using QP set 225, example operation 200 first includes reverse rate circuitry 106 measuring a respective complexity 215 for each frame 205. As an example, reverse rate circuitry 106 determines complexity 1 215-1 for frame 1 205-1, complexity 2 215-2 for frame 2 205-2, complexity 3 215-3 for frame 3 205-3, and complexity N 215-N for frame N 205-N. A complexity 215, for example, represents an amount or value of information in a frame that differs from one or more reference frames associated with the frame. After determining a complexity 215 for each frame 205, example operation 200 includes reverse rate circuitry 106 determining an encoded output bit calculation 285 for each frame 205 based on the determined complexity 215 associated with the frame 205 and the QP 235 associated with the frame 205. As an example, reverse rate circuitry 106 estimates encoded output bit calculation 1 285-1 for frame 1 205-1 based on complexity 1 215-1 and QP 1 235-1, encoded output bit calculation 2 285-2 for frame 2 205-2 based on complexity 2 215-2 and QP 2 235-2, encoded output bit calculation 3 285-3 for frame 3 205-3 based on complexity 3 215-3 and QP 3 235-3, and encoded output bit calculation N 285-N for frame N 205-N based on complexity N 215-N and QP N 235-N. An encoded output bit calculation 285, for example, represents an estimation of the number of bits of an encoded frame produced by encoding a frame having a respective complexity 215 using a corresponding QP 235.

Once reverse rate circuitry 106 has estimated an encoded output bit calculation 285 for each frame 205, example operation 200 includes reverse rate circuitry 106 combining each estimated encoded output bit calculation 285 to produce a number of total encoded output bits 245. The number of total encoded output bits 245 represents, for example, an estimation of the number of bits resulting from encoding each frame 205 of the set of frames to be encoded using QP set 225. After determining the number of total encoded output bits 245, reverse rate circuitry 106 then performs total encoded output bit comparison operation 255. Total encoded output bit comparison operation 255 includes reverse rate circuitry 106 comparing the number of total encoded output bits 245 to the frame size target threshold 130. Based on the number of total encoded output bits 245 being greater than or less than the frame size target threshold 130, reverse rate circuitry 106 performs update QP set operation 265. Update QP set operation 265 includes, for example, reverse rate circuitry 106 increasing, decreasing, or both one or more QPs 235 of QP set 225 so as to have the number of total encoded output bits 245 approach the frame size target threshold 130. In embodiments, reverse rate circuitry 106 is configured to increase, decrease, or both one or more QPs 235 of QP set 225 so as to maintain one or more predetermined relationships among the QPs 235. Based on the number of total encoded output bits 245 equal to the frame size target threshold 130, example operation 200 includes the encoders 108 performing encode frames operation 275. During encode frames operation 275, the encoders encode the frames 205 using the QP set 225. As an example, the encoders 108 encode each frame 205 using a corresponding QP 235 of the QP set 225.

Figure 3:
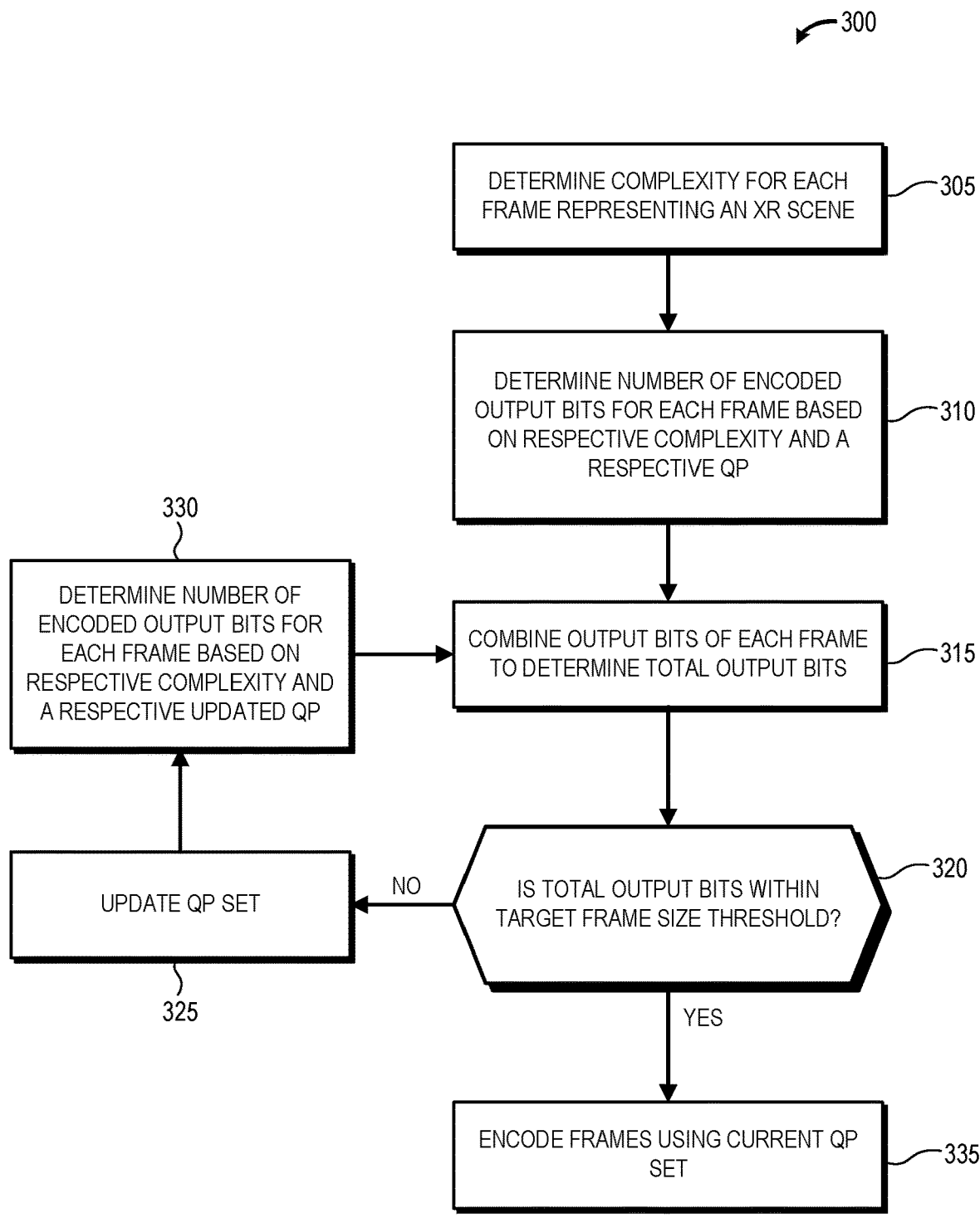
FIG. 3 is a flow diagram of an example method for multi-channel video rate control in a cloud-based XR system, in accordance with some embodiments.

Referring now to FIG. 3, an example method 300 for multi-channel video rate control is presented, in accordance with some embodiments. According to embodiments, at block 305, example method 300 first includes reverse rate circuitry 106 determining a respective complexity 215 for each frame of a set of frames to be encoded that include two or more frames including data (e.g., pixel values) for two or more views of an XR scene and two or more frames including depth data (e.g., depth maps) for two or more views of the XR scene. As an example, the set of frames to be encoded includes a first frame (e.g., left view frame 118), second frame (e.g., right view frame 120), third frame (e.g., left view depth frame 122), and fourth frame (e.g., right view depth frame 124). After determining respective complexities for the first, second, third, and fourth frames, at block 310, reverse rate circuitry 106 is configured to determine a respective number of encoded output bits for each of the first, second, third, and fourth frames based on the determined complexity associated with the frame and a QP (e.g., QP 235) of an initial QP set (e.g., QP set 225) associated with the frame. The respective number of encoded output bits, for example, represents an estimation of the number of bits of an encoded frame resulting from encoding a frame (e.g., a frame having a respective complexity) using an associated QP of the initial QP set. After determining the number of encoded output bits for the first, second, third, and fourth frames, at block 315, reverse rate circuitry 106 combines the number of encoded output bits estimated for each frame to produce a total number of encoded output bits. For example, reverse rate circuitry 106 combines the number of encoded output bits associated with the first frame, the number of encoded output bits associated with the second frame, the number of encoded output bits associated with the third frame, and the number of encoded output bits associated with the fourth frame to produce the total number of encoded output bits. Such a total number of encoded output bits, for example, represents an estimation of the number of bits of the encoded frames resulting from encoding the first, second, third, and fourth frames using the initial QP set.

At block 320, reverse rate circuitry 106 is configured to compare the total number of encoded output bits to the frame size target threshold 130. Based on the total number of encoded output bits being outside (e.g., greater than, less than) the frame size target threshold 130, at block 325, reverse rate circuitry 106 is configured to update one or more QPs 235 of the initial QP set to produce an updated QP set. For example, reverse rate circuitry 106 is configured to increase, decrease, or both one or more QPs 235 of QP set 225 such that the total number of encoded output bits approaches the frame size target threshold 130. According to embodiments, reverse rate circuitry 106 is configured to increase, decrease, or any combination one or more QPs 235 of QP set 225 such that one or more predetermined relationships between two or more QPs 235 are maintained. Once one or more QPs 235 of QP set 225 are updated to produce an updated QP set, at block 330, reverse rate circuitry 106 determines a respective number of encoded output bits for each of the first, second, third, and fourth frames based on the determined complexity associated with the frame and a QP 235 of the updated QP set associated with the frame. After determining a respective number of encoded output bits for each of the first, second, third, and fourth frames based on the determined complexity associated with the frame and a QP 235 of the updated QP set associated with the frame, reverse rate circuitry 106 goes back to block 315 and combines the determined numbers of encoded output bits for the frames. Referring again to block 320, based on the total number of encoded output bits being within (e.g., greater than, less than) the frame size target threshold 130, at block 335, the encoders 108 encode the first, second, third, and fourth frames using respective QPs from the current QP set (e.g., initial QP set, updated QP set).

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory) or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An extended reality system, comprising:
  one or more servers comprising:
    a rate circuitry configured to:
      estimate a total number of encoded output bits for a plurality of frames based on a plurality of a set of quantization parameters including a corresponding quantization parameter for each frame of the plurality of frames, the plurality of frames including a first frame representing a first view of an extended reality scene, a second frame representing a second view of the extended reality scene, a third frame representing depth data associated with the first view of the extended reality scene, and a fourth frame representing depth data associated with the second view of the extended reality scene; and
      based on a comparison of the total number of encoded output bits to a target frame size threshold, update the set of quantization parameters; and
    an encoder configured to encode the plurality of frames based on the set of quantization parameters.

2. The extended reality system of claim 1, wherein the rate circuitry is configured to:
   estimate, for each frame of the plurality of frames, a respective number of encoded output bits based on a corresponding quantization parameter of the set of quantization parameters.

3. The extended reality system of claim 2, wherein the rate circuitry is configured to:
   combine the respective number of encoded output bits associated with each frame of the plurality of frames to produce the total number of encoded output bits.

4. The extended reality system of claim 1, wherein the rate circuitry is configured to:
   update the set of quantization parameters such that a predetermined relationship between two or more quantization parameters in the set of quantization parameters is maintained.

5. The extended reality system of claim 1, wherein the one or more servers further comprise:
   a streaming circuitry configured to:
      packetize the encoded plurality of frames;
      and transmit one or more packets representing the encoded plurality of frames via a network.

6. The extended reality system of claim 5, further comprising:
   a head-worn display configured to:
   receive, via the network, the one or more packets representing the encoded plurality of frames; and
   decode at least a portion of the one or packets to generate a first decoded frame representing a first view of the extended reality scene and a second decoded frame representing a second view of the extended reality scene, wherein the first view is different from the second view.

7. The extended reality system of claim 6, wherein the head-worn display is further configured to:
   decode at least a second portion of the one or more packets to generate a third decoded frame representing depth data associated with the first view of the extended reality scene and a fourth decoded frame representing depth data associated with the second view of the extended reality scene.

8. The extended reality system of claim 7, wherein the head-worn display is further configured to:
   perform one or more reprojection techniques based on the third decoded frame and the fourth decoded frame.

9. The extended reality system of claim 1, wherein the one or more servers further comprise:
   a streaming circuitry configured to determine the target frame size threshold based on an available bandwidth of a network.

10. An extended reality system, comprising:
    one or more servers comprising:
       a rate circuitry configured to:
          estimate a total number of encoded output bits for a plurality of frames based on a plurality of a set of quantization parameters including a corresponding quantization parameter for each frame of the plurality of frames, the rate circuitry configured to estimate the total number of encoded output bits by:
             estimating, for each frame of the plurality of frames, a respective number of encoded output bits based on a corresponding quantization parameter of the set of quantization parameters; and
             combining the respective number of encoded output bits associated with each frame of the plurality of frames to produce the total number of encoded output bits; and
          update the set of quantization parameters based on a comparison of the total number of encoded output bits to a target frame size threshold; and
       an encoder configured to encode the plurality of frames based on the set of quantization parameters, wherein the plurality of frames includes a first frame representing a first view of an extended reality scene and a second frame representing a second view of the extended reality scene.

11. The extended reality system of claim 10, wherein the plurality of frames includes:
    a third frame representing depth data associated with the first view of the XR scene; and
    a fourth frame representing depth data associated with the second view of the XR scene.

12. The extended reality system of claim 10, wherein the rate circuitry is configured to:
    update the set of QPs such that a predetermined relationship between two or more QPs in the set of QPs is maintained.

13. The extended reality system of claim 10, wherein the one or more servers further comprise:
    a streaming circuitry configured to determine the target frame size threshold based on an available bandwidth of a network.

14. A extended reality system, comprising:
    one or more servers comprising:
       a rate circuitry configured to:
          estimate a total number of encoded output bits for a plurality of frames based on a plurality of a set of quantization parameters including a corresponding quantization parameter for each frame of the plurality of frames, wherein the plurality of frames includes a first frame representing a first view of an extended reality scene and a second frame representing a second view of the extended reality scene; and
          based on a comparison of the total number of encoded output bits to a target frame size threshold, update the set of quantization parameters;
       an encoder configured to encode the plurality of frames based on the set of quantization parameters; and
       a streaming circuitry configured to:
          packetize the encoded plurality of frames; and
          transmit one or more packets representing the encoded plurality of frames via a network; and
    a head-worn display configured to:
       receive, via the network, the one or more packets representing the encoded plurality of frames; and
       decode at least a portion of the one or packets to generate a first decoded frame representing a first view of the XR scene and a second decoded frame representing a second view of the XR scene, wherein the first view is different from the second view.

15. The extended reality system of claim 14, wherein the head-worn display is further configured to:
    decode at least a second portion of the one or more packets to generate a third decoded frame representing depth data associated with the first view of the extended reality scene and a fourth decoded frame representing depth data associated with the second view of the extended reality scene.

16. The extended reality system of claim 15, wherein the head-worn display is further configured to:
perform one or more reprojection techniques based on the third decoded frame and the fourth decoded frame.

17. The extended reality system of claim 14, wherein the plurality of frames includes:
a third frame representing depth data associated with the first view of the extended reality scene; and
a fourth frame representing depth data associated with the second view of the extended reality scene.

18. The extended reality system of claim 14, wherein the rate circuitry is configured to:
estimate, for each frame of the plurality of frames, a respective number of encoded output bits based on a corresponding quantization parameter of the set of quantization parameters.

19. The extended reality system of claim 18, wherein the rate circuitry is configured to:
combine the respective number of encoded output bits associated with each frame of the plurality of frames to produce the total number of encoded output bits.

20. The extended reality system of claim 14, wherein the one or more servers further comprise:
a streaming circuitry configured to determine the target frame size threshold based on an available bandwidth of a network.

* * * * *